June 29, 1954 S. P. KISH 2,682,111
REPRODUCTION FIXTURE
Filed Dec. 23, 1948 2 Sheets-Sheet 2

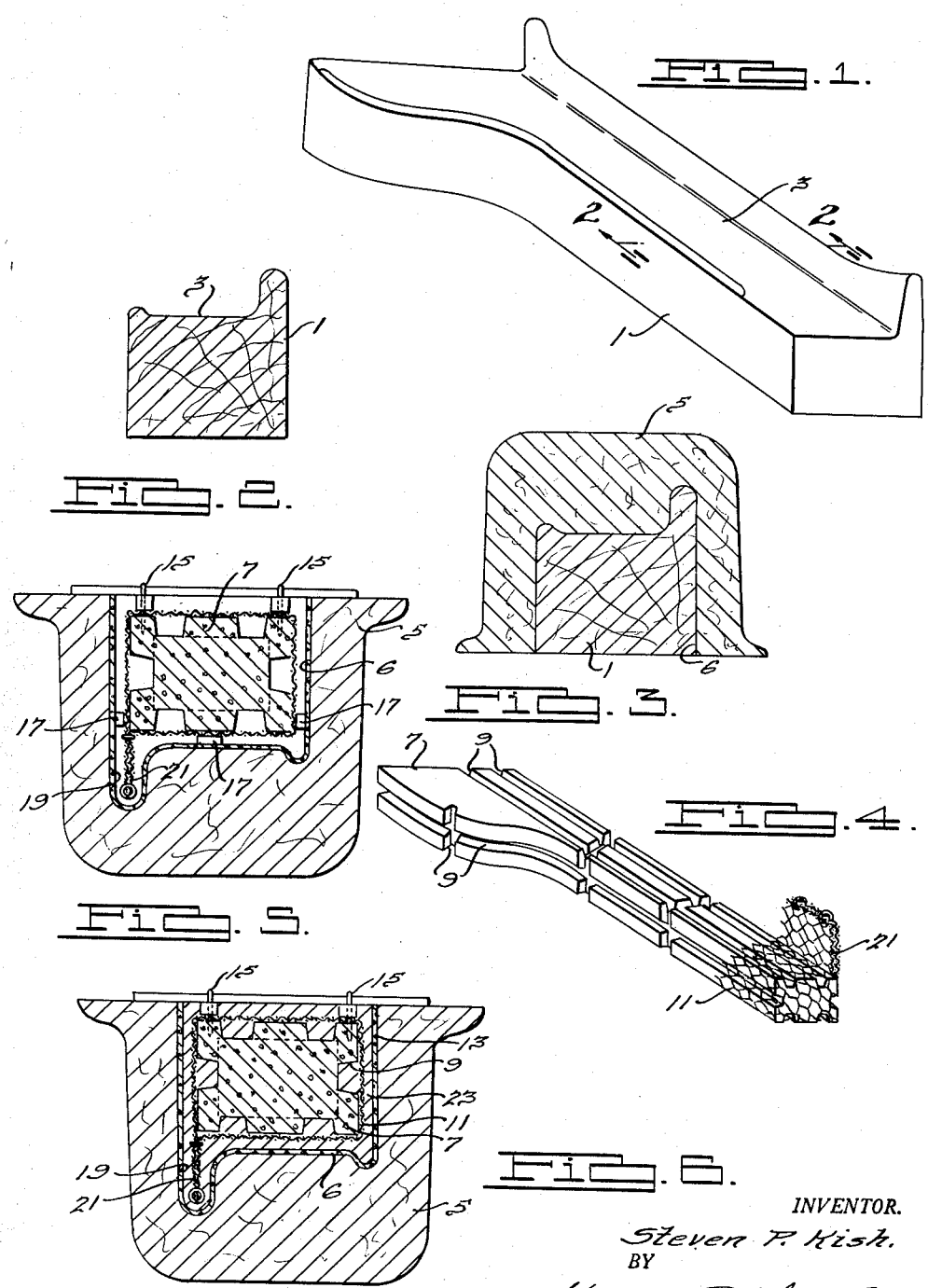

INVENTOR.
Steven P. Kish.
BY
Harness, Dickey & Pierce.
ATTORNEYS.

Patented June 29, 1954

2,682,111

UNITED STATES PATENT OFFICE 2,682,111

REPRODUCTION FIXTURE

Steven P. Kish, Lansing, Mich., assignor to Kish Plastic Products, Inc., Lansing, Mich., a corporation of Michigan Application December 23, 1948, Serial No. 66,886

4 Claims. (Cl. 33—174)

This invention relates to the art of tool making and, in particular, refers to an improved fixture, and method of making the same, for use as a die model, die model duplication, hammer form, spotting rack, checking fixture, and similar applications familiar to those in the art.

In the automobile industry, for example, the production of a new body style involves a number of expensive tooling operations. The first step in these operations is the preparation, by hand methods from the drawings, of a master model of each of the newly designed parts and often a master die model for the part. These master models are obviously very valuable and are therefore used only for reference purposes. It is necessary, however, to have tools for various purposes which accurately present the surfaces shown in original form on the master model. Thus, it is necessary to have die models for use in the machining of the production dies. It is necessary to have checking fixtures for inspecting the mass produced parts and spotting racks for checking the production dies. In some cases it may be necessary to have hammer forms or other die elements to assist in the actual manufacture of the production parts. Also, in some instances it is necessary to have assembly fixtures in which the manufactured parts are placed and held securely and rigidly in the desired shape or form, while stiffening or reinforcing ribs or the like are welded or otherwise fastened thereto. These tools, which are hereinafter referred to as "reproductions fixtures," are prepared from the master models by conventional methods least likely to injure the master, i. e., by casting.

It is evident that the value of reproduction fixtures is directly related to their wear resistance and to their dimensional stability. It is also desirable to have the fixtures as light as is consistent with the retention of satisfactory properties of wear resistance and dimensional stability inasmuch as the handling thereof is, at best, a very awkward process. It will be recognized that the satisfaction of these considerations is in part a matter of the proper selection of materials from which to make the fixtures. Traditionally, mahogany or similar high quality wood has been used to provide the body or frame of the fixture. Very recently it has become the practice to use a plastic to form the reproduced surface, this plastic being integrated in a suitable manner with the wooden frame. This method has been an important advance over the more conventional practice due to the desirable flow characteristics of the plastic, which makes it easier to cast than materials used before, and to its toughness and wear resistance after hardening.

Not even the plastic coated wooden fixture, however, has given the desired combination of wear resistance, dimensional stability, and lightness. While this fixture has suitable wear resistance, it is still heavy and awkward and it, like its predecessors, is not entirely satisfactory from the standpoint of dimensional stability. The wood in the fixtures is, of course, subject to dimensional variation with changes in atmospheric conditions. This failing, plus that of actual deterioration, has been so acute that it is practically impossible for these fixtures to be shipped overseas. In the case of the plastic coated wood fixtures, the problem of dimensional variation is aggravated by the difference in expansion coefficiencts and response to atmospheric changes, and it is rare, indeed, if such fixtures are still satisfactory at the end of a year's time.

Reproduction fixtures of the present invention do not have the foregoing undesirable characteristics. Instead they have optimum properties, taken singly or in combination, of wear resistance, dimensional stability, and lightness. Furthermore, they have a toughness and resiliency which attenuates shock loads and absorbs certain forces tending to cause dimensional changes. In addition to these advantages, the fixtures of the present invention are less expensive to produce than those available heretofore.

Various features of the invention will be described in connection with the accompanying drawings, in which:

Fig. 1 is a perspective view of a wooden master die model of a sill plate for an automobile;

Fig. 2 is a cross section taken on line 2—2 of Fig. 1;

Fig. 3 is a cross section of a plaster cast formed around the die model of Figs. 1 and 2;

Fig. 4 is a perspective view showing a core piece constructed in accordance with the invention for the reproduction fixture to be made of the die model of Figs. 1 and 2;

Figs. 5 through 8 are cross sections showing successive stages in the construction of a reproduction fixture according to the invention;

Figure 7:
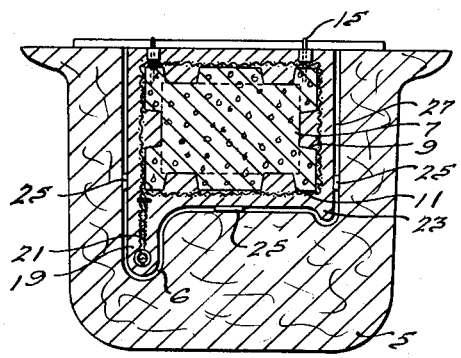

In Figs. 1 and 2 is shown a wooden master model 1 of a die which is to be used to stamp out a sill having a surface contour indicated by the face 3 of the model. Also, it will be observed that the model 1 has a supporting base portion 2 disposed behind and interrupting the continuity of the contour face 3. The undersurface 4 of the base 2 is planar and arranged in a definite predetermined angular relation with respect to the contact face 3 so as to hold the latter in a particular selected orientation when the model is supported on the surface 4. In accordance with the invention, a cast 5 of plaster or other suitable material is made of the face 3 and the adjacent sides of the model 1 by method well known in the art (Fig. 3). The wooden model is removed from the cast 5 which then becomes a mold with a cavity 6 for the formation of a reproduction fixture that is identical to the model 1.

The core or frame 7 of the fixture is shown in Fig. 4 and is roughly similar in shape but smaller than the model 1. This core is formed from a light weight material such as an expanded plastic. A typical material which has been used with much success is foamed or expanded polystyrene such as that sold by the Dow Chemical Company under the trade name "Styrofoam." This particular material has a cell or bubble size of about 3 mm., weighs about 1.6 lbs. per cu. ft. (mahogany weighs about 40 lbs. per cu ft.), has a strength in compression of about 30 p. s. i., and is preferably aged or treated in such a manner as to render it stable. The core 7 can be readily routed from a block of this material and a number of longitudinal and transverse grooves 9 may be formed in the sides of the core if desired. Such striated structure increases the resistance of the fixture to warpage, improves the bond between the coat and core, and materially strengthens and reinforces the fixture, as will appear hereinafter. The outer core periphery is also preferably wrapped with a suitable wire or mesh 11. If desired, the core 7 may be suspended in the cavity 6 of mold 5 and a suitable material such as thermosetting plastic is poured around it to form upon hardening a replica of the model 1. In addition to being adaptable to a molding process, the material selected for coating the core should have a suitable hardness, strength, and toughness and preferably expansion characteristics which are similar to those of the core material, though it will be evident that the latter is capable of absorbing a substantial amount of relative movement. Materials having the properties of the urea formaldehyde or phenol formaldehyde resins have been found to be particularly desirable, and these produce unusually good results when used with a core formed of expanded polystyrene.

It has been found, however, that when the fixture is formed by the simple pouring process just described, difficulties are likely to be encountered due to warpage of the coating plastic in setting or curing. To avoid such possibilities, the fixture is preferably formed in accordance with the method illustrated in Figs. 5 through 8. According to this procedure, the mold cavity 6 is first lined with a layer 13 of sheet wax, the polystyrene, core material or other similar material, which may be stripped from the surface of the coating plastic in the manner to be presently indicated. The core 7 is then suspended or disposed in the cavity 6, as by means of the hangers 15, and is spaced from the walls of the cavity as shown. To assist in such spacing, plugs 17 of the coating or other suitable material are inserted between the core and the cavity walls. If it is desired to reinforce the protuberance 19 of the fixture, a double wire mesh 21 or other suitable support may be affixed to the core of mesh 11 and extended thereinto or the mesh 11 may itself be extended and rebent upon itself as actually shown at 21.

With the core 7 in place, as shown in Fig. 5, the mold is poured so that it appears as shown in Fig. 6. The coating material flows into the grooves 9 through the mesh 11 and into the cells of the core material 7 as well as into the cells of the liner 13 to form the coat 23. The mold 5 with the core and coating therein is then treated in a proper manner to set or cure the coating material and after this treatment, the fixture is removed and the liner 13 is stripped or peeled from the mold. The fixture is suspended again in the cavity 6 (Fig. 7) and spacers 25 may be used to assist in proper spacing. There is a space 27 between the surface of coat 23 and the cavity 6 which corresponds to the thickness of the removed liner 13 as affected by warpage in setting. This space is preferably of substantially less thickness than the coat 23 already formed so that the stresses occasioned by curing of the thinner coat plastic material subsequently poured therein (Fig. 8) are insufficient to warp the dimensionally stable coat 23 and core 7. The same resinous material preferably is used for the thin outer coat as was used for the inner coat 23 so that it integrates with and is inseparable from the inner coat.

Figure 8:
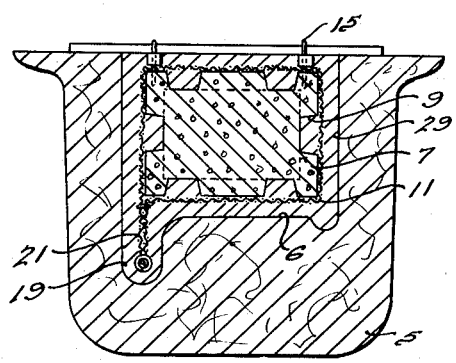

After the outer coat has been suitably cured, the fixture of Fig. 8 is removed from the mold. It will be observed that the fixture then constitutes an identical replica of the master model 1. The fixture has an outer casing and an inner core, both of plastic resin material and both having substantially the same coefficient of thermal expansion to insure stability of the fixture to weathering. The expanded material of the core makes the fixture relatively light in weight but at the same time the expanded plastic provides adequate internal strength for the fixture. The outer casing of the fixture is hard, tough, unyielding, and dimensionally stable to give form and strength to the fixture. Also, it will be observed that the casing has a top face portion which corresponds exactly to the contour face 3 of the model 1 and which duplicates a pattern surface contour of predetermined form. Also, the fixture has a supporting base portion which corresponds to the base 2 of the model. The base portion of the fixture is disposed behind and interrupts the continuity of the contact surface. Also, as clearly shown in the drawings the bottom surface of the base is planar and arranged in the same, definite, predetermined, angular relation with respect to the contact surface as in the model 1 so as to hold the contact surface in a particular selected orientation when the fixture is supported on the surface. Specifically the fixture comprises a core 7 and a coat or casing 29 which includes the mesh 11 and the spacers 17 and 26 that have been absorbed with loss of their identities. The mesh 11 in conjunction with the grooves 9 and the cellular core structure enable the coat 29 to be tightly and permanently attached to the core 7. Though the coat 29 is hard and wear resistant, the inner core 7 is resilient and can absorb forces due to thermal expansion or shock loads. When the preferred materials are employed, or similar materials, their expansion characteristics are so similar that there is little or no tendency for relative motion between the coat and core, thus promoting dimensional stability. These materials are not affected by moisture or atmospheric changes and as indicated are treated so that they are non-aging. As a result, the fixture, though light in weight, has high wear resistance and dimensional stability.

Figure 9:
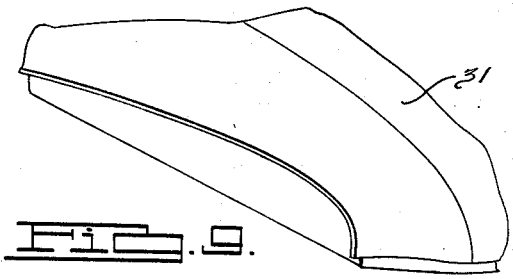
Fig. 9 is a perspective view of a die model of an automobile hood constructed in accordance with the invention.
Figure 10:
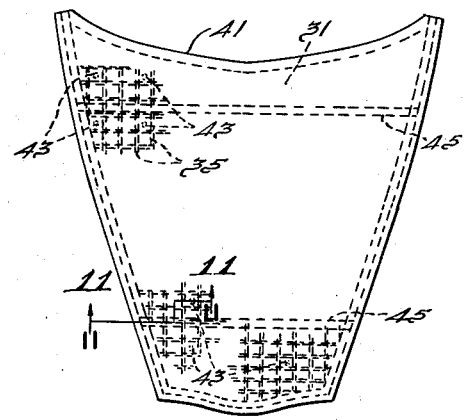
Fig. 10 is a plan view of the same.
Figure 11:
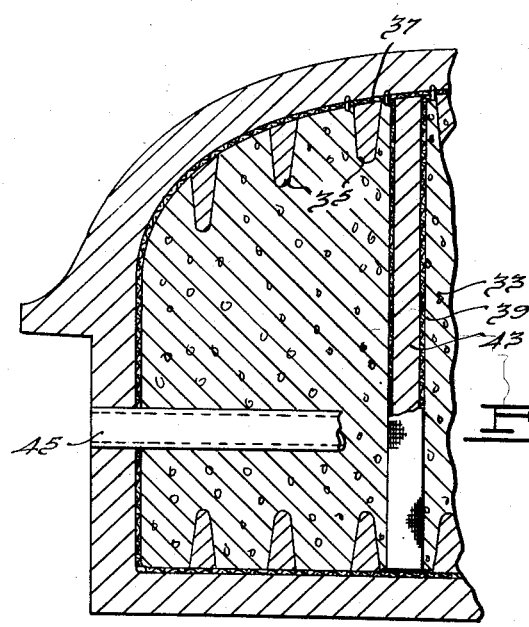
Fig. 11 is a cross section taken on line 11—11 of Fig. 10.

The fixture of Figs. 9 through 11 is fundamentally the same as the one described and is preferably formed by the same process. It is a die model 31 of an automobile hood and is thus of much larger size than the fixture of Figs. 1 through 8 and may therefore include certain additional features to increase its strength and to facilitate handling. As before, the core 33 of the model 31 may have a plurality of longitudinal and transverse grooves 35 and be surrounded by a mesh 37. In addition, however, it is desirably provided with mesh lined vertical holes 39. It will be evident that when the fixture is formed, the material of which the coat 41 is comprised will flow into the holes 39 to form posts 43 therein which interconnect the opposite faces of the model and serve to increase its strength and rigidity with little sacrifice in lightness. In order to facilitate handling, a pair of pipes 45 may be inserted in the core 33 and arranged to open into the side faces of the coat 41 after the fixture is formed. Suitable carrying rods may be extended through the pipes 45 to enable men standing on either side of the model 31 to lift and carry it.

It will be apparent that the invention comprehends various modifications and it is, therefore, not intended to limit it to the specific details discussed above.

What is claimed is:

1. A reproduction fixture such as a die, model, assembly fixture, checking fixture and spotting rack adapted for use as a tool in the manufacture and fabrication of sheet metal parts comprising a three-dimensional geometrical body having an outer casing and an inner core both of plastic resin material and both having substantially the same coefficient of thermal expansion to assure stability of the fixture to weathering, said core being of expanded material to make the fixture relatively light in weight and said expanded material providing internal strength for the fixture, said casing having substantial thickness and being hard, tough, unyielding and dimensionally stable to give form and strength to the fixture, said casing having a top face portion and a supporting base portion therefor, said top face portion provided with an external contact surface duplicating a pattern surface contour, said base portion disposed behind and interrupting the continuity of said contact surface, at least one surface of said base portion being planar and arranged in a definite predetermined, angular relation with respect to said contact surface so as to hold the same in a particular selected orientation when the fixture is supported on said surface.

2. A reproduction fixture such as a die, model, assembly fixture, checking fixture and spotting rack adapted for use as a tool in the manufacture and fabrication of sheet metal parts comprising a three-dimensional geometrical body having an outer casing and an inner core both of plastic resin material and both having substantially the same coefficient of thermal expansion to assure stability of the fixture to weathering, said core being of expanded material to make the fixture relatively light in weight and said expanded material providing internal strength for the fixture, said casing having substantial thickness and being hard, tough, unyielding and dimensionally stable to give form and strength to the fixture and having spaced, integrally connected, internal columns extending through said core and from one side of the casing to the other to strengthen and reinforce the casing and to assist it in withstanding shock, blows, and impacts to which the fixture normally is subjected in use, said casing having a top face portion and a supporting base portion therefor, said top face portion provided with an external contact surface duplicating a pattern surface contour, said base portion disposed behind and interrupting the continuity of said contact surface, at least one surface of said base portion being planar and arranged in a definite predetermined, angular relation with respect to said contact surface so as to hold the same in a particular selected orientation when the fixture is supported on said surface.

3. An industrial model for use as a tool in the manufacture and fabrication of sheet metal parts comprising a three-dimensional geometrical body having an outer casing and an inner core both of plastic resin material and both having substantially the same coefficient of thermal expansion to assure stability of the fixture to weathering, said core being of expanded material to make the fixture relatively light in weight and said expanded material providing internal strength for the fixture, said casing having substantial thickness and being hard, tough, unyielding and dimensionally stable to give form and strength to the fixture, said casing having a top face portion and a supporting base portion therefor, said top face portion provided with an external contact surface duplicating a pattern surface contour, said base portion disposed behind and interrupting the continuity of said contact surface, at least one surface of said base portion being planar and arranged in a definite predetermined, angular relation with respect to said contact surface so as to hold the same in a particular selected orientation when the fixture is supported on said surface.

4. A reproduction fixture such as a die, model, assembly fixture, checking fixture and spotting rack adapted for use as a tool in the manufacture and fabrication of sheet-metal parts comprising a three-dimensional geometrical body having an outer casing and an inner core both of plastic resin material and both having substantially the same coefficient of thermal expansion to assure stability of the fixture to weathering, said core being of expanded material to make the fixture relatively light in weight and said expanded material providing internal strength for the fixture, said casing having substantial thickness and being hard, tough, unyielding and dimensionally stable to give form and strength to the fixture, said casing having a top face portion and a supporting base portion therefor, said top face portion provided with an external contact surface duplicating a pattern surface contour, said base portion disposed behind and interrupting the continuity of said contact surface.

References Cited in the file of this patent

UNITED STATES PATENTS

| Number | Name | Date |
| --- | --- | --- |
| 753,959 | Crump | Mar. 8, 1904 |
| 821,066 | Sonn | May 22, 1906 |
| 1,960,120 | Mohring | May 22, 1934 |
| 2,031,786 | Oldham | Feb. 25, 1936 |

(Other references on following page)

UNITED STATES PATENTS

| Number | Name | Date |
|---|---|---|
| 2,189,154 | Stewart | Feb. 6, 1940 |
| 2,217,434 | Dorn | Oct. 8, 1940 |
| 2,223,394 | Thompson | Dec. 3, 1940 |
| 2,291,738 | Luth | Aug. 4, 1942 |
| 2,300,503 | Hamister | Nov. 3, 1942 |
| 2,306,570 | Scripture | Dec. 29, 1942 |
| 2,376,653 | Boyer | May 22, 1943 |
| 2,371,047 | Groehn | Mar. 6, 1945 |
| 2,446,429 | Nelson et al. | Aug. 3, 1948 |
| 2,460,242 | Renaud | Jan. 25, 1949 |
| 2,481,809 | Barnes | Sept. 13, 1949 |

FOREIGN PATENTS

| Number | Country | Date |
|---|---|---|
| 436,287 | Great Britain | Apr. 25, 1935 |

OTHER REFERENCES

Cooper: Plastics Institute Transactions, April 1948, pp. 51, 55, 57.

Ser. No. 212,074, Dornier (A. P. C.), published May 11, 1943.